(12) United States Patent
Yu et al.

(10) Patent No.: US 12,273,774 B2
(45) Date of Patent: Apr. 8, 2025

(54) METHOD AND APPARATUS FOR PRE-EMPTING A RESOURCE

(71) Applicant: LENOVO (BEIJING) LIMITED, Beijing (CN)

(72) Inventors: Xiaodong Yu, Beijing (CN); Zhennian Sun, Beijing (CN); Karthikeyan Ganesan, Kaiserslautern (DE); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 432 days.

(21) Appl. No.: 17/774,996

(22) PCT Filed: Nov. 6, 2019

(86) PCT No.: PCT/CN2019/116002
§ 371 (c)(1),
(2) Date: May 6, 2022

(87) PCT Pub. No.: WO2021/087807
PCT Pub. Date: May 14, 2021

(65) Prior Publication Data
US 2022/0394560 A1 Dec. 8, 2022

(51) Int. Cl.
*H04W 28/26* (2009.01)
*H04L 1/18* (2023.01)
*H04L 1/1812* (2023.01)
*H04W 72/02* (2009.01)
*H04W 72/04* (2023.01)
(Continued)

(52) U.S. Cl.
CPC .......... *H04W 28/26* (2013.01); *H04L 1/1812* (2013.01); *H04W 72/02* (2013.01);
(Continued)

(58) Field of Classification Search
CPC . H04W 28/26; H04W 72/02; H04W 72/0446; H04W 72/0453; H04W 72/20; H04W 72/56; H04W 76/14; H04L 1/1812
See application file for complete search history.

(56) References Cited

U.S. PATENT DOCUMENTS

2021/0058938 A1* 2/2021 Hosseini ............. H04W 52/383
2021/0127383 A1* 4/2021 Hui ....................... H04L 1/1812
(Continued)

FOREIGN PATENT DOCUMENTS

WO  2017027375 A1  2/2017
WO  2019160788 A1  8/2019

OTHER PUBLICATIONS

International Searching Authority, "Written Opinion of the International Searching Authority," PCT/CN2019/116002, Jul. 22, 2020, pp. 1-4.
(Continued)

*Primary Examiner* — Hoang-Chuong Q Vu
(74) *Attorney, Agent, or Firm* — Kunzler Bean & Adamson

(57) ABSTRACT

Embodiments of the present application are related to a method and apparatus for pre-empting a resource of a user equipment (UE) supporting New Radio (NR). A method for sidelink communications performed by a UE according to an embodiment of the present application includes: receiving a sidelink control information (SCI) indicating one or more reserved resources, wherein the SCI explicitly or implicitly indicates a pre-emption indication (PI) resource on physical sidelink feedback channel (PSFCH); determining whether the one or more reserved resources can be pre-empted; upon determining that the one or more reserved resources can be pre-empted, transmitting a PI on the PI resource on the PSFCH to pre-empt the one or more reserved resources; and
(Continued)

performing a sidelink transmission on the pre-empted one or more reserved resources.

20 Claims, 10 Drawing Sheets

(51) Int. Cl.
*H04W 72/0446* (2023.01)
*H04W 72/0453* (2023.01)
*H04W 72/10* (2009.01)
*H04W 72/20* (2023.01)
*H04W 72/56* (2023.01)

(52) U.S. Cl.
CPC ... *H04W 72/0446* (2013.01); *H04W 72/0453* (2013.01); *H04W 72/20* (2023.01); *H04W 72/56* (2023.01)

(56) References Cited

U.S. PATENT DOCUMENTS

| | | | |
|---|---|---|---|
| 2021/0385822 A1* | 12/2021 | Chae | H04W 72/56 |
| 2022/0248376 A1* | 8/2022 | Hui | H04L 5/001 |
| 2022/0279536 A1* | 9/2022 | Khsiba | H04W 72/569 |

OTHER PUBLICATIONS

Samsung, On Resource Allocation for NR V2X Mode 2, 3GPP TSG RAN WG1 #97, R1-1906936, May 13-17, 2019, pp. 1-7, Reno, USA.

Lenovo, Motorola Mobility, Discussion on resource allocation for NR sidelink Mode 1, 3GPP TSG RAN WG1 #98bis, R1-1910145, Oct. 14-20, 2019, pp. 1-8, Chongqing, China.

* cited by examiner

METHOD AND APPARATUS FOR PRE-EMPTING A RESOURCE

TECHNICAL FIELD

Embodiments of the present application generally relate to wireless communication technology, especially to a method and an apparatus for pre-empting a resource of a user equipment (UE) supporting 3GPP (3rd Generation Partnership Project) 5G new radio (NR).

BACKGROUND

Vehicle to everything (V2X) has been introduced into 5G wireless communication technology. In terms of a channel structure of V2X communication, the direct link between two user equipments (UEs) is called a sidelink. Sidelink is a long-term evolution (LTE) feature introduced in 3GPP Release 12, and enables a direct communication between proximal UEs, and data does not need to go through a base station (BS) or a core network.

A V2X service under 3GPP 5G NR adopts a pre-emption mechanism. However, details of a pre-emption mechanism between UEs have not been discussed in 3GPP 5G NR technology yet.

SUMMARY

Some embodiments of the present application provide a method for sidelink communications performed by a user equipment (UE). The method includes: receiving a sidelink control information (SCI) indicating one or more reserved resources, wherein the SCI explicitly or implicitly indicates a pre-emption indication (PI) resource on physical sidelink feedback channel (PSFCH); determining whether the one or more reserved resources can be pre-empted; upon determining that the one or more reserved resources can be pre-empted, transmitting a PI on the PI resource on the PSFCH to pre-empt the one or more reserved resources; and performing a sidelink transmission on the pre-empted one or more reserved resources.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method for sidelink communications performed by a UE.

Some embodiments of the present application provide a method for sidelink communications performed by a UE. The method includes: receiving downlink control information (DCI) from a base station (BS) or a network, wherein the DCI indicates the UE to transmit a PI on a sidelink, and the DCI further indicates a PI resource on the sidelink; and transmitting the PI on the PI resource according to the DCI.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method for sidelink communications performed by a UE.

Some embodiments of the present application provide a method for sidelink communications performed by a UE. The method includes: monitoring a PI on PSFCH; and upon receiving the PI, stopping using one or more reserved resources for transmitting an initial transmission of a transport block (TB) or a retransmission of a TB.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement a method, such as one abovementioned method for sidelink communications performed by a UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

Figure 1:
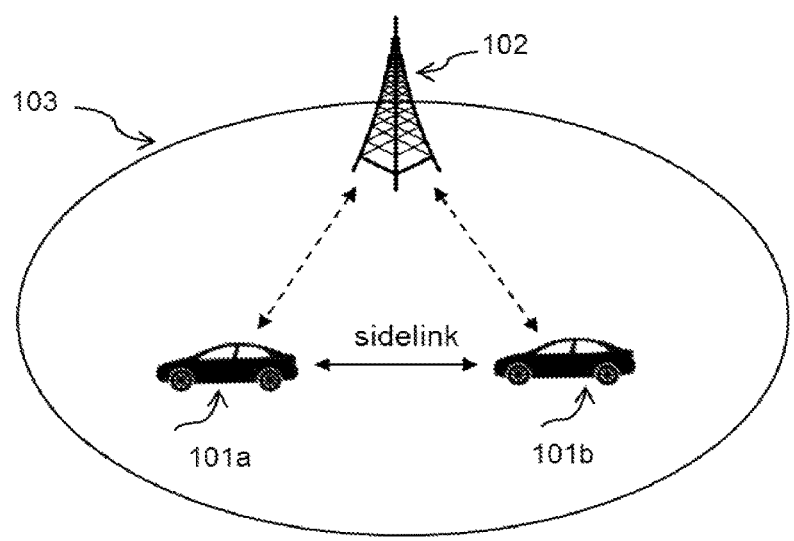
FIG. 1 illustrates an exemplary V2X communication system in accordance with some embodiments of the present application.

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

UE(s) under NR V2X scenario may be referred to as V2X UE(s). A V2X UE, which transmits data according to sidelink resource(s) scheduled by a base station (BS), may be referred to as a UE for transmitting, a transmitting UE, a transmitting V2X UE, a Tx UE, a V2X Tx UE, or the like. A V2X UE, which receives data according to sidelink resource(s) scheduled by a BS, may be referred to as a UE for receiving, a receiving UE, a receiving V2X UE, a Rx UE, a V2X Rx UE, or the like.

V2X UE(s) may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like.

According to some embodiments of the present application, V2X UE(s) may include a portable wireless communication device, a smart phone, a cellular telephone, a flip phone, a device having a subscriber identity module, a personal computer, a selective call receiver, or any other device that is capable of sending and receiving communication signals on a wireless network.

According to some embodiments of the present application, V2X UE(s) includes wearable devices, such as smart watches, fitness bands, optical head-mounted displays, or the like. Moreover, V2X UE(s) may be referred to as a subscriber unit, a mobile, a mobile station, a user, a terminal, a mobile terminal, a wireless terminal, a fixed terminal, a subscriber station, a user terminal, or a device, or described using other terminology used in the art. V2X UE(s) may communicate directly with BS(s) via uplink (UL) communication signals.

A BS under NR V2X scenario may be referred to as a base unit, a base, an access point, an access terminal, a macro cell, a Node-B, an enhanced Node B (eNB), a gNB, a Home Node-B, a relay node, a device, a remote unit, or by any other terminology used in the art. A BS may be distributed over a geographic region. Generally, a BS is a part of a radio access network that may include one or more controllers communicably coupled to one or more corresponding base stations.

A BS is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicably coupled to a mobility management entity (MME), a serving gateway (SGW), and/or a packet data network gateway (PGW).

A BS may serve a number of V2X UEs within a serving area, for example, a cell or a cell sector via a wireless communication link. A BS may communicate directly with one or more of V2X UEs via communication signals. For example, a BS may serve V2X UEs within a macro cell.

Sidelink communication between a Tx UE and a Rx UE under NR V2X scenario includes groupcast communication, unicast communication, or broadcast communication.

Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

FIG. 1 illustrates an exemplary V2X communication system in accordance with some embodiments of the present application.

As shown in FIG. 1, the V2X communication system includes a base station, i.e., BS 102 and some V2X UEs, i.e., UE 101a and UE 101b. UE 101a and UE 101b may be configured to perform sidelink unicast transmission, sidelink groupcast transmission, or sidelink broadcast transmission. It is contemplated that, in accordance with some other embodiments of the present application, a V2X communication system may include more or fewer BSs, and more or fewer V2X UEs. Moreover, it is contemplated that names of V2X UEs (which represent a Tx UE, a Rx UE, and etc.) as illustrated and shown in FIG. 1 may be different, e.g., UE 101c, UE 104f, and UE 108g or the like.

In addition, although each V2X UE as shown in FIG. 1 is illustrated in the shape of a car, it is contemplated that a V2X communication system may include any type of UE (e.g., a roadmap device, a cell phone, a computer, a laptop, IoT (internet of things) device or other type of device) in accordance with some other embodiments of the present application.

According to some embodiments of FIG. 1, UE 101a functions as a Tx UE, and UE 101b functions as a Rx UE. UE 101a may exchange V2X messages with UE 101b through a sidelink, for example, PC5 interface as defined in 3GPP TS 23.303. UE 101a may transmit information or data to other UE(s) within the V2X communication system, through sidelink unicast, sidelink groupcast, or sidelink broadcast. For instance, UE 101a transmits data to UE 101b in a sidelink unicast session. UE 101a may transmit data to UE 101b and other UEs in a groupcast group (not shown in FIG. 1) by a sidelink groupcast transmission session. Also, UE 102 may transmit data to UE 101b and other UEs (not shown in FIG. 1) by a sidelink broadcast transmission session.

Alternatively, according to some other embodiments of FIG. 1, UE 101b functions as a Tx UE and transmits V2X messages, UE 101a functions as a Rx UE and receives the V2X messages from UE 101b.

Both UE 101a and UE 101b in the embodiments of FIG. 1 may transmit information to BS 102 and receive control information from BS 102. BS 102 may define one or more cells, and each cell may have a coverage area. As shown in FIG. 1, both UE 101a and UE 101b are within a coverage area 103 of BS 102.

BS 102 as illustrated and shown in FIG. 1 is not a specific base station, but may be any base station(s) in the V2X communication system. For example, if the V2X communication system includes two BSs 102, UE 101 being within a coverage area of any one the two BSs 102 may be called as a case that UE 101 is within a coverage of BS 102 in the V2X communication system; and only UE 101 being outside of coverage area(s) of both BSs 102 can be called as a case that UE 101 is outside of the coverage of BS 102 in the V2X communication system.

For a V2X communication system, in some cases, when a UE selects a resource for sidelink transmission, there is no enough sidelink candidate resource(s) or sidelink residual resource(s) for data generated by the UE, e.g., a transport block (TB). Here, no enough sidelink resource for the data generated by the UE means that sidelink resources are occupied by going transmission(s), sidelink resources are reserved by others UE(s), or only a part of resources are available for the UE. Under such cases, it is impossible for highest/higher priority transmissions to get immediate access to resources without collisions with lower priority transmissions. Accordingly, a pre-emption mechanism needs to be introduced to the sidelink communication. The UE may pre-empt the reserved resource from other UE(s).

In 3GPP 5G NR V2X technology, a pre-emption mechanism is introduced for Mode 2 in 3GPP Release 16 NR V2X, but details of a pre-emption mechanism have not been defined.

Some embodiments of the present application provide a method for implementing a pre-emption operation. Some embodiments of the present application provide a method for transmitting a pre-emption indication (PI). Some embodiments of the present application provide a method for receiving a PI. Some embodiments of the present application provide a method for performing a pre-emption operation based on control information.

Some embodiments of the present application provide an apparatus for implementing a pre-emption operation. Some embodiments of the present application provide an apparatus for transmitting a PI. Some embodiments of the present application provide an apparatus for receiving a PI. Some embodiments of the present application provide an apparatus for performing a pre-emption operation based on control information.

Some embodiments of the present application define contents, size, a transmission physical channel of a PI. Some embodiments of the present application multiplex a PI with other sidelink transmission(s) (e.g., hybrid automatic repeat request (HARQ) acknowledgement (ACK) or HARQ non-acknowledgement (NACK) on sidelink).

A UE which preempts reserved resource(s) from another UE may be named as pre-emption UE. Pre-emption UE may be a Tx UE or a Rx UE. A UE whose reserved resource(s) is pre-empted may be named as pre-empted UE. Pre-empted UE may be a Tx UE or a Rx UE.

In some embodiments of the present application, pre-emption UE and pre-empted UE may be in a groupcast group or are neighboring UEs. For example, pre-empted UE is a TX UE transmitting data or reserved resources for communicating with another UE with priority level X; pre-emption UE is an additional nearby UE which may or may not communicate with the pre-empted UE and the abovementioned another UE. Since pre-emption UE requires resource for transmitting data with a priority level greater than the priority level X, the pre-emption UE may pre-empt reserved resource of the pre-empted UE.

In some embodiments of the present application, a network or a BS can enable or disable a reservation of resource per resource pool or according to a UE with a dedicated configuration or common configuration. For example, a network or a BS can enable or disable a reservation of resource based on a priority level of a logical channel (LCH). There may be a LCH restriction on the reservation of resources.

In one example, in the V2X communication system as illustrated and shown in FIG. 1, UE 101a may be pre-emption UE and UE 101b may be pre-empted UE. In a further example, another UE not shown in FIG. 1 may be pre-emption UE, and one of UE 101a and UE 101b illustrated and shown in FIG. 1 may be pre-empted UE.

Figure 2:
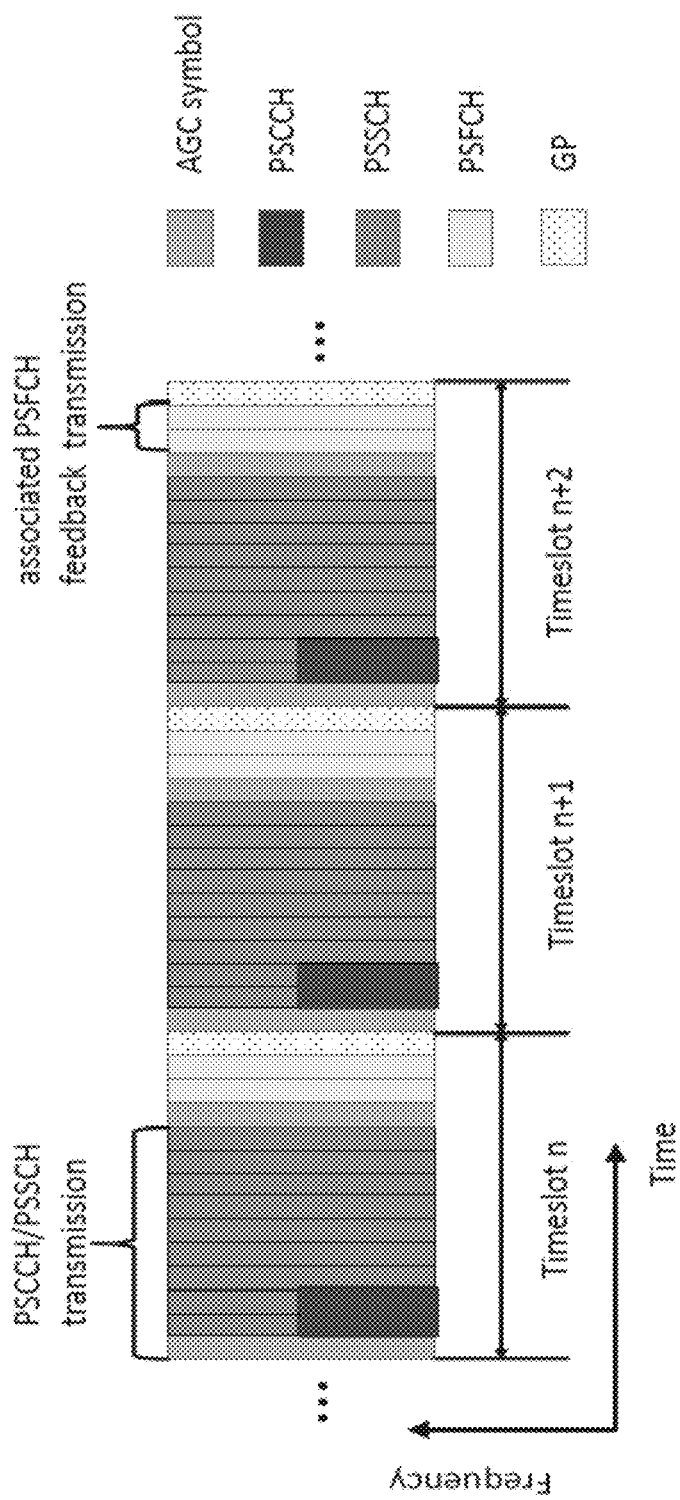
FIG. 2 illustrates an exemplary V2X communication data format in accordance with some embodiments of the present application.

FIG. 2 illustrates an exemplary V2X communication data format in accordance with some embodiments of the present application. FIG. 2 shows V2X communication data including symbols in three time slots of time domain, i.e., Timeslot n, Timeslot n+1, and Timeslot n+2, of a V2X communication system. It is contemplated that, in accordance with some other embodiments of the present application, V2X communication data may include more or fewer symbols in more or fewer time slots in time domain.

As illustrated and shown in FIG. 2, the V2X communication data includes an automatic gain control (AGC) symbol, a physical sidelink shared channel (PSCCH) transmission, a physical sidelink shared channel (PSSCH) transmission, a PSFCH transmission, and guard period (GP). Data information may be transmitted in a PSCCH transmission or a PSSCH transmission, and a feedback associated with the data information, e.g., a HARQ feedback, may be transmitted in a PSFCH transmission.

The V2X communication data as illustrated and shown in FIG. 2 may be transmitted in the V2X communication system as illustrated and shown in FIG. 1. In some embodiments of the present application, FIG. 2 refers to a sidelink unicast communication system. In some embodiments of the present application, FIG. 2 refers to a sidelink groupcast communication system.

For sidelink unicast or groupcast communication system, a Tx UE (e.g., UE 101a illustrated and shown in FIG. 1) may transmit data information to a Rx UE (e.g., UE 101b illustrated and shown in FIG. 1) in Timeslot n as illustrated and shown in FIG. 2. The data information may be transmitted in a PSCCH transmission or a PSSCH transmission, i.e., PSCCH/PSSCH transmission as illustrated and shown in FIG. 2. The Tx UE may expect to receive a HARQ feedback for the data information at Timeslot n+k. A specific value of k is configured by a BS or a network. The HARQ feedback is transmitted on PSFCH.

For example, as illustrated and shown in FIG. 2, the Tx UE expects to receive associated PSFCH feedback transmission at Timeslot n+2, which means that k=2. In another example, the Tx UE may expect to receive associated PSFCH feedback transmission at Timeslot n+5, which means that k=5.

Figure 3:
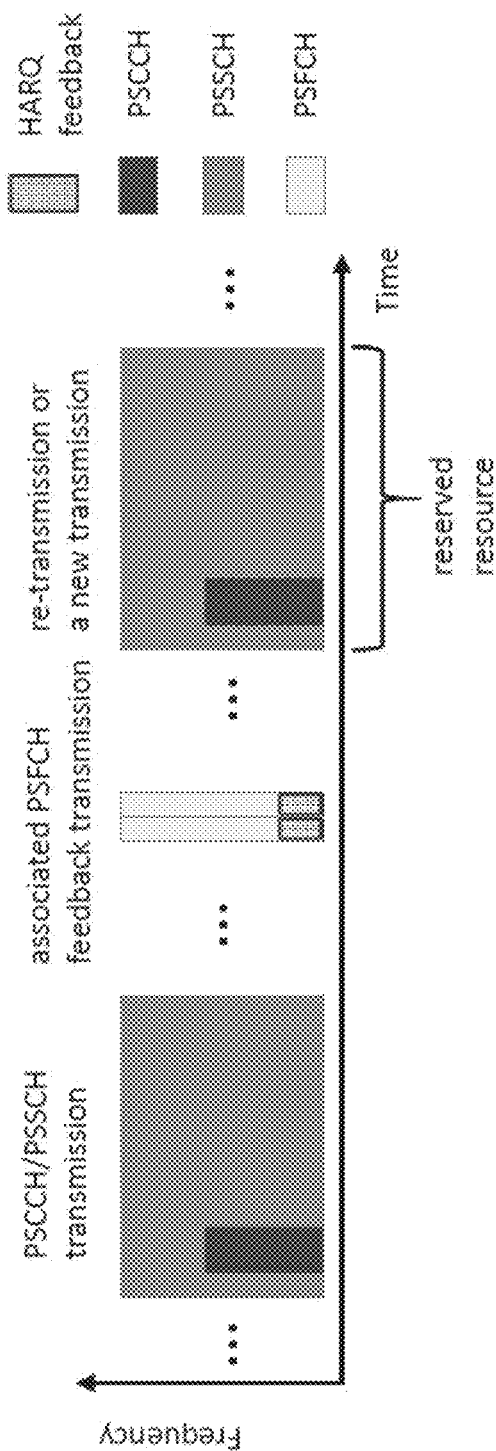
FIG. 3 illustrates a further exemplary V2X communication data format in accordance with some embodiments of the present application.

FIG. 3 illustrates a further exemplary V2X communication data format in accordance with some embodiments of the present application. Similar to FIG. 2, the V2X communication data as illustrated and shown in FIG. 3 may be transmitted in the V2X communication system as illustrated and shown in FIG. 1, and the V2X communication data may include more or fewer symbols in more or fewer time slots in time domain.

In embodiments of FIG. 3, when a Tx UE (e.g., UE 101a illustrated and shown in FIG. 1) transmits data in a PSCCH/PSSCH transmission, sidelink control information (SCI) is carried on the PSCCH transmission, to indicate the PSSCH transmission. For example, the SCI indicates the PSSCH transmission in the same timeslot. The SCI may explicitly or implicitly indicate a HARQ feedback, which is associated with the data, on a PSFCH transmission. As shown in FIG. 3, a HARQ feedback is carried on the associated PSFCH feedback transmission.

The SCI also indicates one or more reserved resources for re-transmission of the same data or a new transmission of new data. For instance, The SCI indicates reserved resources for re-transmission of the same transport block (TB) or a transmission of a next TB. As illustrated and shown in FIG. 3, a reserved resource indicated by the SCI is used to transmit the re-transmission of the same data or a new transmission of new data.

Figure 4:
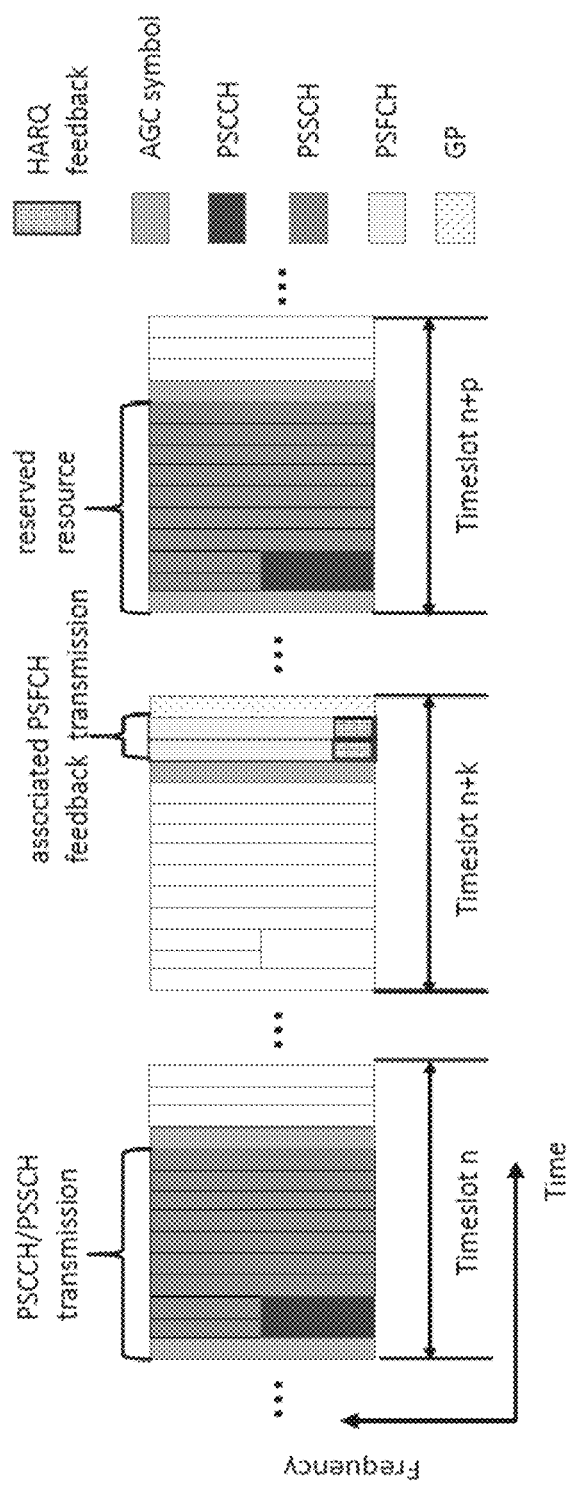
FIG. 4 illustrates an additional exemplary V2X communication data format in accordance with some embodiments of the present application.

FIG. 4 illustrates an additional exemplary V2X communication data format in accordance with some embodiments of the present application. Similar to FIGS. 2 and 3, the V2X communication data as illustrated and shown in FIG. 4 may be transmitted in the V2X communication system as illustrated and shown in FIG. 1, and the V2X communication data may include more or fewer symbols in more or fewer time slots in time domain.

In embodiments of FIG. 4, a Tx UE (e.g., UE 101a illustrated and shown in FIG. 1) transmits data in a PSCCH/PSSCH transmission in Timeslot n. SCI is carried on the PSCCH transmission in Timeslot n, to indicate the PSSCH transmission in Timeslot n. The SCI may explicitly or implicitly indicate a HARQ feedback, which is associated with the data transmitted in the PSCCH/PSSCH transmission, on a PSFCH transmission. As shown in FIG. 4, HARQ feedbacks are carried on two symbols in the associated PSFCH feedback transmission in Timeslot n+k. The value k may be configured per different resource pools. The SCI also indicates one or more reserved resources for re-transmission of the same data or a new transmission of new data. For instance, the SCI indicates reserved resources in Timeslot n+p for re-transmission of the same data or a new transmission of new data.

More specifically, in some embodiments for sidelink unicast communication, a Tx UE A (pre-empted UE) (e.g., UE 101a illustrated and shown in FIG. 1) transmits a PSCCH/PSSCH (i.e., data information) to a Rx UE in Timeslot n and its associated feedback in Timeslot n+k, where the associated feedback is carried in PSFCH. The Tx UE A also indicates a reserved resource in SCI (on PSCCH) to reserve the retransmission of the same TB or transmission of the next TB in Timeslot n+p. If a Tx UE C (which may be the Rx UE that receives data from the Tx UE A) (e.g., UE 101b illustrated and shown in FIG. 1) determines to preempt the reserved resource in Timeslot n+p, the Tx UE C may transmits a pre-emption indication in timeslot n+k on PSFCH.

Figure 5:
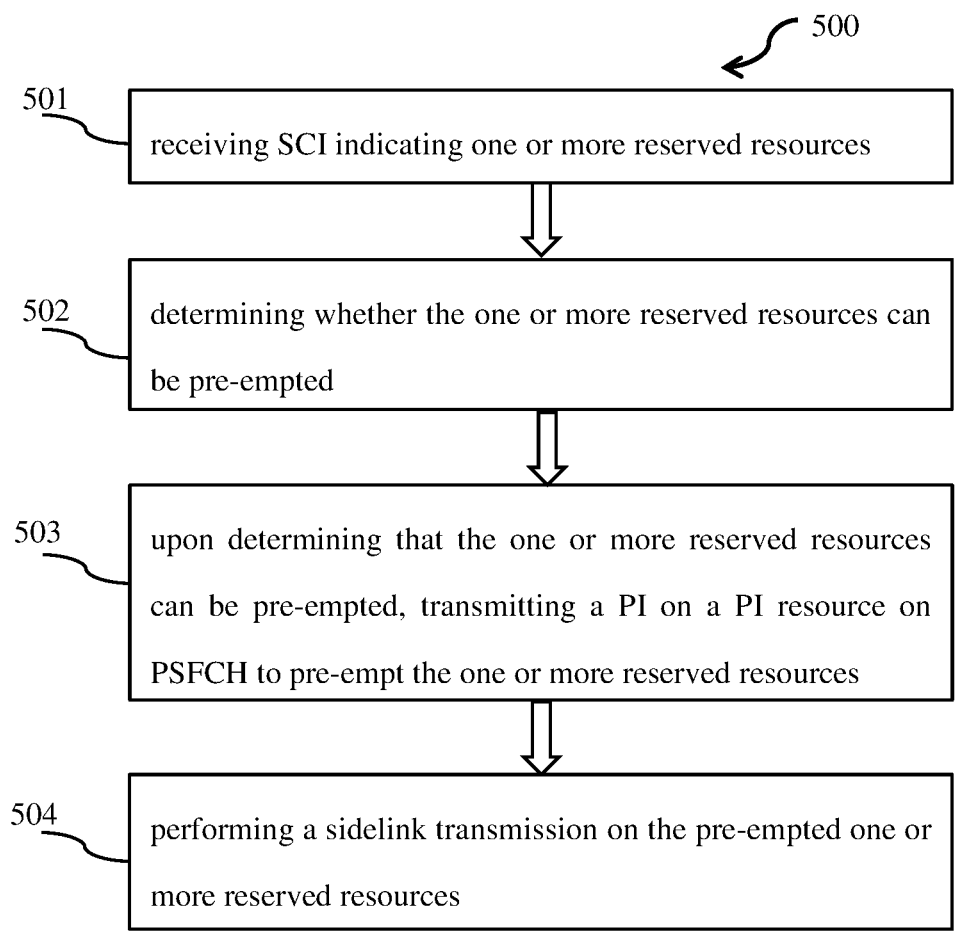
FIG. 5 illustrates an exemplary flow chart of a method for wireless communication in accordance with some embodiments of the present application.

FIG. 5 illustrates an exemplary flow chart of a method for wireless communication in accordance with some embodiments of the present application. The embodiments of FIG. 5 may be performed by pre-emption UE (e.g., UE 101a or UE 101b illustrated and shown in FIG. 1).

In the exemplary method 500 as illustrated and shown in FIG. 5, when a UE (e.g., UE 101a illustrated and shown in FIG. 1) selects a resource for sidelink transmission, but there is not enough sidelink candidate resource(s) or sidelink residual resource(s) for data generated by the UE, the UE may functions as pre-emption UE and preempt reserved resource(s) from another UE (e.g., UE 101b illustrated and shown in FIG. 1) which functions as pre-empted UE.

In step 501, pre-emption UE receives SCI indicating one or more reserved resources. The SCI explicitly or implicitly indicates a PI resource on PSFCH. In step 502, the pre-emption UE determines whether the one or more reserved resources can be pre-empted. Upon determining that the one or more reserved resources can be pre-empted, in step 503, the pre-emption UE transmits a PI on the PI resource on the PSFCH to pre-empt the one or more reserved resources. In step 504, the pre-emption UE performs a sidelink transmission on the pre-empted one or more reserved resources.

For example, pre-emption UE receives SCI from pre-empted UE, and then, after determining that one or more reserved resources indicated in the SCI can be pre-empted, the pre-emption UE transmits a PI on a PI resource on the PSFCH indicated in the SCI and transmits a TB on a sidelink on the pre-empted reserved resource(s). The pre-empted UE will cannot use the reserved resource(s) pre-empted by the pre-emption UE.

As defined in 3GPP Release 14, main steps of resource (re)selection procedure of a UE include the following three steps.

Step 1: All resources are considered as available.

Step 2: a UE excludes resources at least based on scheduling assignment (SA) decoding and additional conditions.

A resource is excluded if the resource is indicated or reserved by a decoded SA and PSSCH RSRP (reference signal received power) in the associated data resource is above a threshold.

If the number of remaining resource after Step 2 is smaller than 20% of the total resources within the selection window of a legacy sensing mechanism, the UE repeats Step 2 using all the thresholds increased by 3 dB until the number of remaining resource after Step 2 is larger than 20% of the total resources.

Step 3: the UE selects its transmission resource from the resources not excluded.

The UE measures and ranks the remaining PSSCH resources based on total received energy and then selects a subset.

The UE randomly selects one resource from the subset.

In some embodiments of the present application, when a packet is generated at a Tx UE and the Tx UE determines that there is no suitable resource can be used for sidelink transmission based on a legacy sensing mechanism, the Tx UE is triggered to perform a pre-emption operation. That is, the Tx UE functions as pre-emption UE. Pre-emption UE may determine to perform a pre-emption operation based on at least one of the following five triggering conditions. In other words, two or more of the following five triggering conditions may be satisfied at the same time.

(1) Compared with a resource ratio threshold value of a total number of candidate resources, there is no enough candidate resource in a resource selection window of a sensing mechanism.

In particular, legacy reporting ratio X during a sensing procedure is 20% only. In some embodiments of the present application, when pre-emption UE cannot get enough candidate resource in resource selection window during a sensing procedure, reporting ratio X of the pre-emption UE is smaller than a configured or pre-configured ratio X.

(2) Compared with a power threshold value, there is no suitable candidate resource in resource selection window of a sensing mechanism.

As defined in 3GPP TS36.213 in Release 14, a total number of candidate single-subframe resources is denoted by $M_{total}$, and PSSCH RSRP threshold is denoted by $Th_{a,b}$. If the number of candidate single-subframe resources remaining in a set is smaller than a produce of 20% and $M_{total}$, then $Th_{a,b}$ is increased by 3 dB.

In some embodiments of the present application, $Th_{a,b}$ may be increased by one or more times. When $Th_{a,b}$ is increased to be greater than a pre-configured value, e.g., P, the UE can determines that there is no suitable candidate resource in resource selection window.

(3) After a power is increased in times greater than a maximum increasing threshold number, there is no suitable candidate resource in the resource selection window.

In some embodiments of the present application, when the maximum number of increasing the PSSCH-RSRP threshold, e.g., Y, is greater than pre-configured value, the UE can determines that there is no suitable candidate resource in resource selection window. Y may be different from legacy 20%.

(4) A measured channel busy ratio (CBR) is greater than a CBR threshold value. The CBR threshold value is a pre-configured value.

(5) A packet delay budget, e.g., T2, of the sidelink transmission is less than a delay budget threshold value. The delay budget threshold value is a pre-configured value.

In some embodiments of the present application, the above configuration values are configured or pre-configured per quality of service (QoS) requirements, priority levels, and/or per resource pool. For example, each of the resource ratio threshold value, the power threshold value, the maximum increasing threshold number, the CBR threshold value, and the delay budget threshold value may be configured or pre-configured; and each of them may be configured or pre-configured according to different QoS requirements, different resource pools, or a combination thereof.

In some embodiments of the present application, after determining to perform a pre-emption operation, the pre-emption UE may select a pre-emption reserved resource set including one or more reserved resources, and then report the pre-emption reserved resource set to an upper layer.

More specifically, with reference to FIG. 5, the pre-emption UE may determine that one or more reserved resources can be pre-empted, when satisfying at least one of the following conditions. In other words, the following two conditions may be satisfied at the same time.

(1) when a priority level indicated in the SCI (which was received in step 501) is lower than a priority level of the pre-emption UE.

In particular, once pre-emption UE determines that its priority level (e.g., priority 0) is higher than a priority level (e.g., priority 1) indicated in the SCI received from the pre-empted UE, the pre-emption UE determines that one or more reserved resources indicated in the SCI can be pre-empted.

The priority level of pre-empted UE may be pre-configured according to different QoS requirements, different resource pools, or a combination thereof.

The priority level of pre-emption UE may be configured or pre-configured according to different resource pools.

For example, a UE (pre-emption UE) may preempt a transmission resource for another UE (pre-empted UE), when a priority level X of pre-emption UE is higher than a priority level Y of the pre-empted UE.

(2) transmission times of a sidelink transmission indicated in the SCI is equal to or greater than threshold transmission times.

The threshold transmission times may be configured or pre-configured according to different QoS requirements, different resource pools, different measured CBR, or a combination thereof. For example:

The configured or pre-configured transmission times of a TB are per resource pool configuration.

The configured or pre-configured transmission times of a TB is based on the pre-configured or based on measured CBR The configured or pre-configured transmission times of a TB is based on a pre-configured QoS level.

In one example, once pre-emption UE determines that transmission times of a sidelink transmission indicated in the SCI is equal to threshold transmission times, the pre-emption UE determines that one or more reserved resources indicated in the SCI can be pre-empted.

In another example, once pre-emption UE determines that transmission times of a sidelink transmission indicated in the SCI is greater than threshold transmission times, the pre-emption UE determines that one or more reserved resources indicated in the SCI can be pre-empted.

For instance, Tx UE C (pre-emption UE) can pre-empt a transmission of Tx UE A (pre-empted UE), when a transmission from Tx UE C is an initial transmission of a TB, while a transmission of Tx UE A is the fourth transmission of a TB from Tx UE A.

In some embodiments of the present application, the SCI received by pre-emption UE explicitly indicates time and frequency locations of the PI resource within a resource pool. For instance, the SCI explicitly indicates an offset relationship between time and frequency locations of the SCI within the resource pool and time and frequency locations of the PI resource within the resource pool.

In some embodiments of the present application, the SCI received by pre-emption UE implicitly indicating the PI resource comprises: time and frequency locations of the PI resource within a resource pool are determined based on time and frequency locations of the SCI within the resource pool.

In some embodiments of the present application, the SCI received by pre-emption UE implicitly indicating the PI resource includes an indicator for indicating HARQ enabled or HARQ disabled. Once the pre-emption UE receives, from the SCI, an indicator for indicating HARQ enabled, the pre-emption UE know that a Rx UE will transmit a HARQ feedback on a symbol of PSFCH associated with the SCI. Alternatively, once a pre-emption receives, from the SCI, an indicator for indicating HARQ disabled, the pre-emption UE know that a Rx UE will not transmit a HARQ feedback on a symbol of PSFCH associated with the SCI; in this case, the pre-emption UE in an pre-emption operation may use a HARQ feedback transmission resource, i.e., a symbol of the PSFCH, as the PI resource and transmits a PI on the HARQ feedback transmission resource. In some scenarios, the pre-emption UE and the Rx UE are the same UE.

In some further embodiments of the present application, the SCI received by pre-emption UE implicitly indicating the PI resource includes another indicator for indicating a single sub-channel or a non-single sub-channel. Once the pre-emption UE receives, from the SCI, an indicator for indicating single sub-channel, the pre-emption UE knows that the current transmission uses a single sub-channel; and the pre-emption UE in an pre-emption operation may use a HARQ feedback transmission resource, i.e., a symbol of the PSFCH, as the PI resource and transmits a PI on the HARQ feedback transmission resource.

In some additional embodiments of the present application, the SCI received by pre-emption UE implicitly indicating the PI resource includes both an indicator for indicating HARQ enabled or HARQ disabled and another indicator for indicating a single sub-channel or a non-single sub-channel. For example, each of these two indicators is represented by one bit in the SCI. In particular, for example, if the indicator in the SCI indicates HARQ disabled, a HARQ feedback transmission resource on a PSFCH may be used as the PI resource and the PI can be transmitted on the HARQ feedback transmission resource on the PSFCH. If the abovementioned another indicator in the SCI indicates a single sub-channel, a HARQ feedback transmission resource on a PSFCH may be used as the PI resource and the PI can be transmitted on the HARQ feedback transmission resource on the PSFCH. If the indicator in the SCI indicates HARQ disabled and the abovementioned another indicator in the SCI indicates a single sub-channel, a HARQ feedback transmission resource on a PSFCH may be used as the PI resource and the PI can be transmitted on the HARQ feedback transmission resource on the PSFCH.

In some embodiments of the present application, the SCI received by pre-emption UE further comprises an indicator to enable or disable a pre-emption operation to the one or more reserved resources, and the pre-emption operation is performed only if the indicator represents enabling the pre-emption operation.

A field may be defined in SCI to carry the indicator to enable or disable a pre-emption operation, to be used for pre-emption UE to determine whether a PI resource can be used to transmit a PI or not. That is, although the PI resource has been configured, a UE (pre-empted UE) decides on its own whether its reserved resource can be pre-empted or not. Once the UE decides that its reserved resource can or cannot be pre-empted, the field defined in SCI can be used to indicate such decision. Any other UE (pre-emption UE) which wishes to perform a pre-emption operation cannot pre-empt the reserved resource of the UE according to the field in SCI.

For example, the indicator comprised in the SCI is represented by one bit, value 0 of the bit indicates that the pre-emption operation is enabled and the one or more reserved resources can be pre-empted, and value 1 of the bit indicates that the pre-emption operation is disabled and the one or more reserved resources cannot be pre-empted.

For a further example, the indicator comprised in the SCI is represented by one bit, value 1 of the bit indicates that the pre-emption operation is enabled and the one or more reserved resources can be pre-empted, and value 0 of the bit indicates that the pre-emption operation is disabled and the one or more reserved resources cannot be pre-empted.

In some embodiments of the present application, the PI resource indicated in the SCI and a HARQ feedback transmission resource are located in two different symbols on the PSFCH. The two different symbols are pre-configured according to a resource pool. For example, the PI resource may be configured with a frequency offset in view of a HARQ feedback transmission resource. The HARQ feedback transmission resource can be used to feedback the HARQ information for unicast or groupcast.

In some embodiments of the present application, the PI resource indicated in the SCI is configured in every one timeslot, every two timeslots, or every four timeslots. In some embodiments of the present application, the PI resource indicated in the SCI is configured for unicast, groupcast, broadcast, or a combination there of.

In some embodiments of the present application, the PI resource indicated in the SCI is configured by Radio Resource Control (RRC) signaling. For a resource pool, a set of frequency resources is configured or pre-configured for actually use of PSFCH transmission, and other resources which are not configured for PSFCH can be used for a PI transmission. For example, a resource pool is configured to include the PI resource or not. For instance, a resource pool may be divided into a plurality of sub-channels, and each of the plurality of sub-channels may be configured to include the PI resource or not. A specific example is described and shown in FIG. 6.

Figure 6:
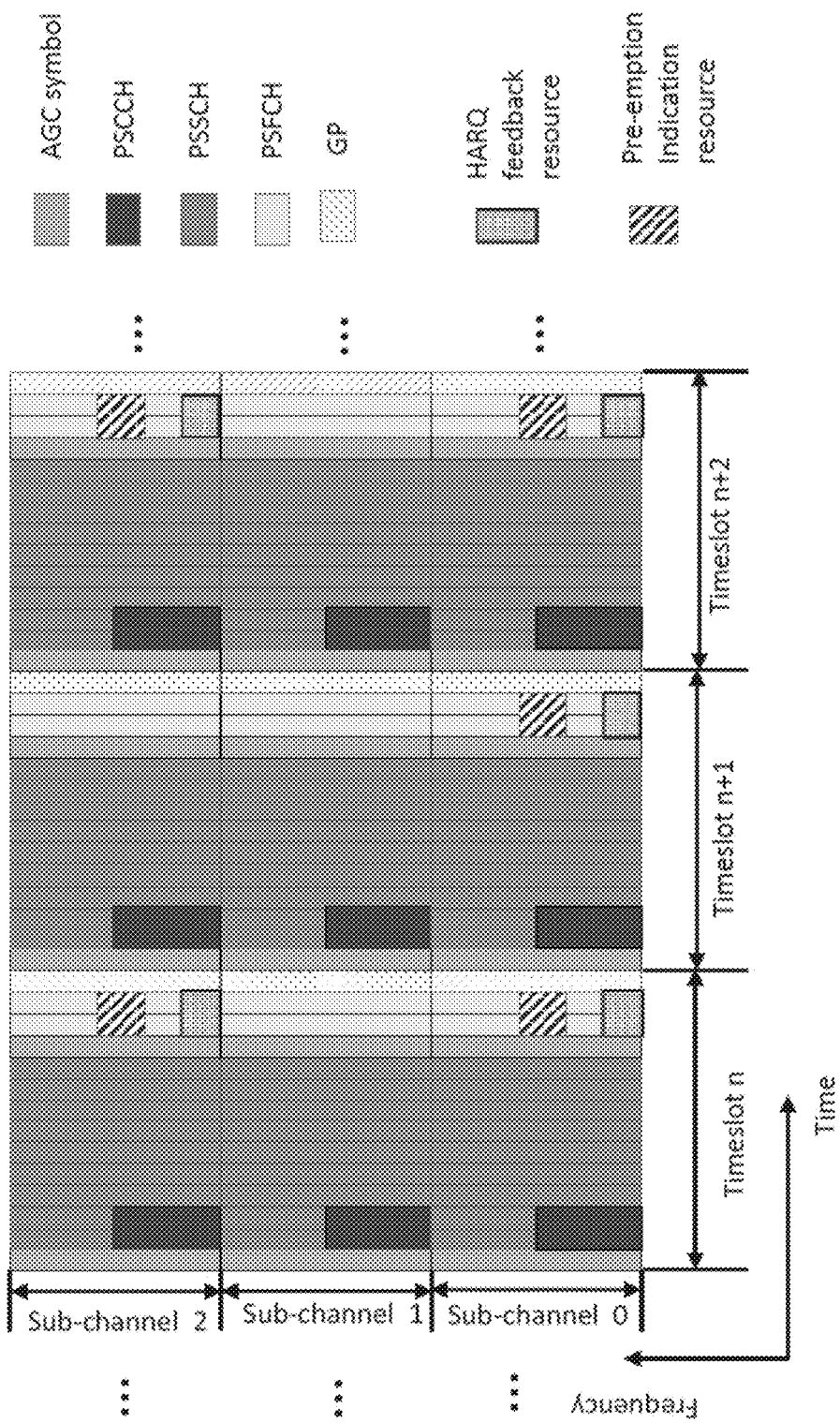
FIG. 6 illustrates another exemplary V2X communication data format in accordance with some embodiments of the present application.

FIG. 6 illustrates another exemplary V2X communication data format in accordance with some embodiments of the present application. Similar to FIGS. 2-4, the V2X communication data as illustrated and shown in FIG. 6 may be transmitted in the V2X communication system as illustrated and shown in FIG. 1, and the V2X communication data may include more or fewer symbols in more or fewer time slots in time domain.

Furthermore, the V2X communication data as illustrated and shown in FIG. 6 further includes three sub-channels in frequency domain, i.e., Sub-channel 0, Sub-channel 1, and Sub-channel 2. It is contemplated that, in accordance with some other embodiments of the present application, the V2X communication data as illustrated and shown in FIG. 6 may include more or fewer symbols in more or few sub-channels in frequency domain.

With reference to FIG. 6, a frequency resource set for a PI may be separated from a frequency resource set for HARQ feedback transmission resource. For a PI format, in the symbols that can be used for a PI transmissions in a resource pool, a set of frequency resources is configured or pre-configured for the actual use of PI transmissions. That is, PSFCH transmissions do not happen in other frequency resources. Such configuration and pre-configuration includes the case in which all frequency resources in a resource pool are available for the actual PI transmission.

Figure 7:
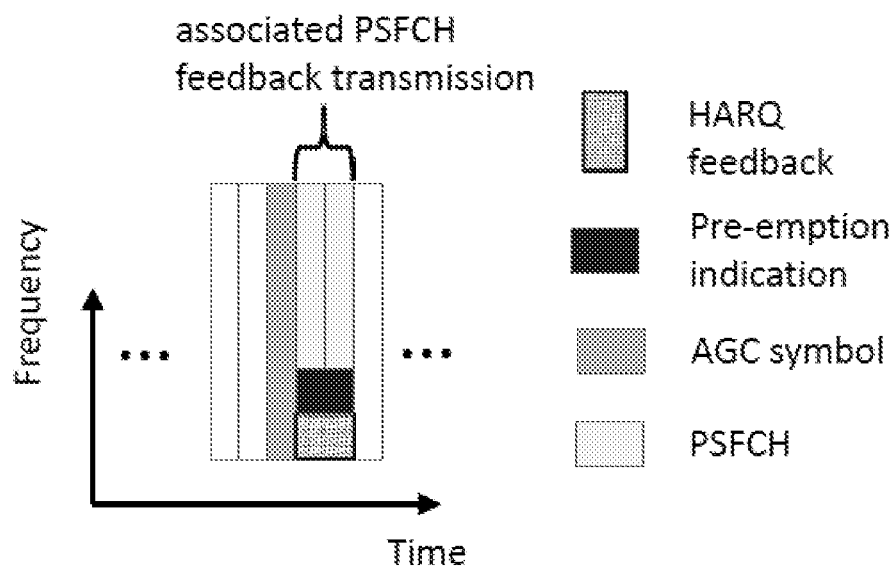
FIG. 7 illustrates an exemplary PI transmission manner in accordance with some embodiments of the present application.
Figure 8:
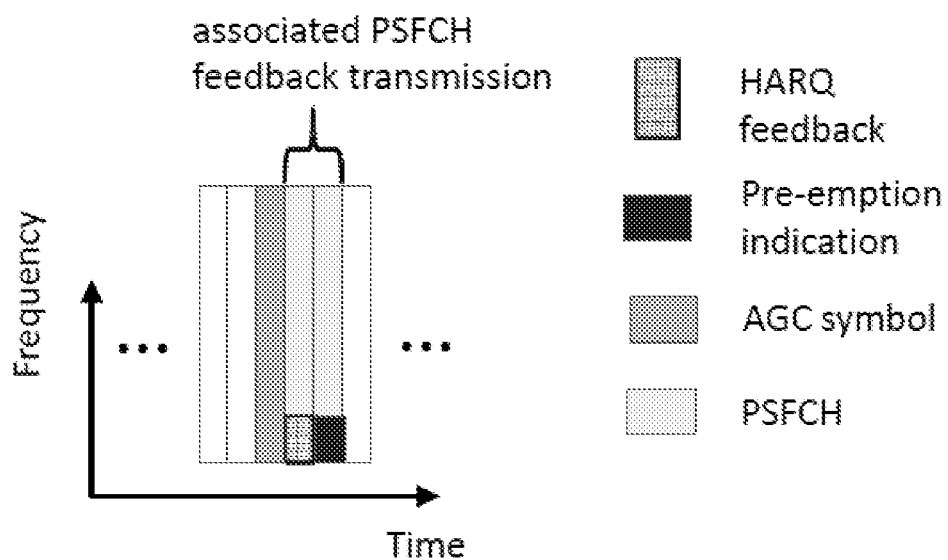
FIG. 8 illustrates a further exemplary PI transmission manner in accordance with some embodiments of the present application.
Figure 9:
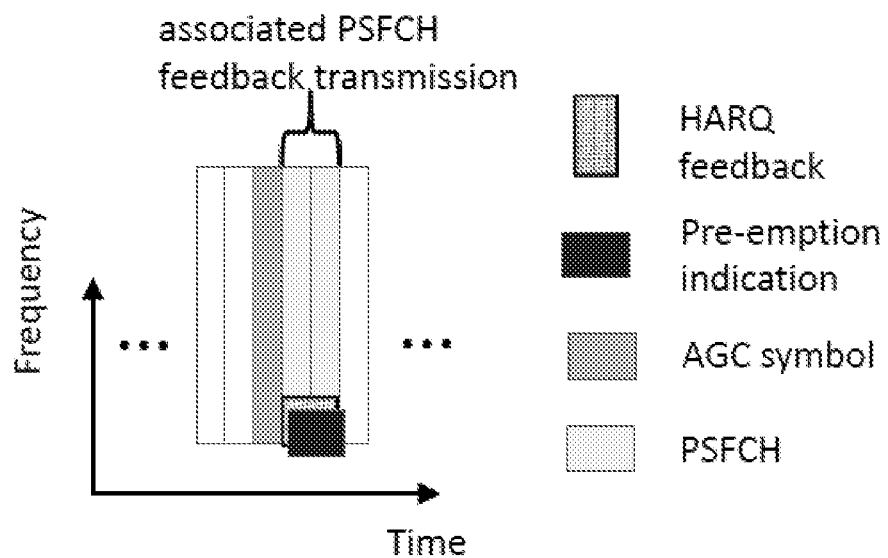
FIG. 9 illustrates another exemplary PI transmission manner in accordance with some embodiments of the present application.

In some embodiments of the present application, a UE (e.g., UE 101a illustrated and shown in FIG. 1) transmitting a PI in the PSFCH symbols can reduce the possibility of half-duplex. A resource for transmitting a PI transmission and resource for transmitting HARQ-ACK feedback could be in frequency division multiplexing (FDM) manner, frequency division multiplexing (TDM) manner, or code division multiplexing (CDM) manner as shown in FIGS. 7-9, respectively, which will be described below. For example, a PI can be transmitted in a resource in a FDM manner with a HARQ feedback transmission resource in the same timeslot.

More specifically, referring to the embodiments of FIG. 6, a FDM manner between PSFCH resources used for HARQ feedback and PSFCH resources are used for a PI transmission. As show in FIG. 6, Sub-channel 0 and Sub-channel 2 are configured with PI resources, whereas Sub-channel 1 is configured without a PI resource. In Timeslot n, PI resources and HARQ feedback transmission resources are in a FDM manner in Sub-channel 0 and Sub-channel 2. Similarly, in Timeslot n+1, a PI resource and a HARQ feedback transmission resource are in a FDM manner in Sub-channel 0. In Timeslot n+2, PI resources and HARQ feedback transmission resources are in a FDM manner in Sub-channel 0 and Sub-channel 2.

In some embodiments of the present application, the PI resource indicated in the SCI is configured with a frequency and/or time offset with the SCI. In the implicit mechanism for a PI resource determination, in a resource pool, one or multiple PSFCH candidate resources are determined from the starting sub-channel index and slot index used for the corresponding PSSCH. For example, the frequency and/or time resource is associated with SCI, and the frequency domain offset is defined using SCI.

In some embodiments of the present application, the method of multiplexing a PI together with HARQ-ACK/NACK feedback can be differentiated according to different PSFCH formats. There may be different PSFCH formats for HARQ ACK feedback or HARQ NACK feedback. Different PSFCH formats for HARQ-ACK/NACK feedback may be multiplexed with a PI. The FDM, TDM and CDM manners of a PI with HARQ ACK-NACK feedback can be distinguished with different PSFCH formats. A TX UE may transmit in SCI a PSFCH format identifier that includes resource information of a PI along with the corresponding HARQ-ACK/NACK feedback. A PI resource and a HARQ-ACK/NACK feedback resource may be semi-statically configured for UEs, considering different methods of multiplexing HARQ-ACK/NACK feedbacks and a PI. The PSFCH format identifier to be used may be dynamically indicated to RX UE(s).

In some other embodiments of the present application, pre-empted UE provides the PI resource in SCI separately from a PSFCH format identifier for HARQ-ACK/NACK feedback. The PI resource can be optionally multiplexed with HARQ-ACK/NACK feedback on a PSFCH resource. The PI resource can be separate from the PSFCH resource for HARQ-ACK/NACK feedback, and can occupy the same symbol as the PSFCH resource for HARQ-ACK/NACK feedback. The PI resource can be separate from the PSFCH resource for HARQ-ACK/NACK feedback, and can occupy different symbols from the PSFCH resource for HARQ-ACK/NACK feedback.

FIG. 7 illustrates an exemplary PI transmission manner in accordance with some embodiments of the present application. In the embodiments of FIG. 7, a resource for transmitting a PI and resource for transmitting HARQ-ACK feedback are in FDM manner.

As illustrated and shown in FIG. 7, a PI resource is configured on the same time resource as a HARQ feedback transmission resource on PSFCH, but the PI resource is configured on a different frequency resource from the HARQ feedback transmission resource on the PSFCH. Both HARQ feedback and a PI are transmitted in associated PSFCH feedback transmission in the same two symbols in the same time slot of the PSFCH, but they are transmitted on different frequencies in frequency domain.

FIG. 8 illustrates a further exemplary PI transmission manner in accordance with some embodiments of the present application. In the embodiments of FIG. 8, a resource for transmitting a PI and resource for transmitting HARQ-ACK feedback are in TDM manner.

As illustrated and shown in FIG. 8, a PI resource is configured on the same frequency resource as a HARQ feedback transmission resource on PSFCH, but the PI resource is configured on a different time resource from the HARQ feedback transmission resource on the PSFCH. Both HARQ feedback and a PI are transmitted in associated PSFCH feedback transmission in the same sub-channel, but they are transmitted in two different symbols in time domain, although they are in the same time slot of the PSFCH.

FIG. 9 illustrates another exemplary PI transmission manner in accordance with some embodiments of the present application. In the embodiments of FIG. 9, a resource for transmitting a PI and resource for transmitting HARQ-ACK feedback are in CDM manner.

As illustrated and shown in FIG. 9, a PI resource is configured on the same time-frequency resource in time and frequency domains as a HARQ feedback transmission resource on the PSFCH, but the PI resource and the HARQ feedback transmission resource uses different cyclic shifts from each other. Both HARQ feedback and a PI are transmitted in associated PSFCH feedback transmission in the same sub-channel and the same two symbols in the same time slot of the PSFCH, but they are transmitted in two different cyclic shifts in codec domain.

In some embodiments of the present application, a PI includes one state to indicate that all reserved resource(s), which is indicated by SCI received from pre-empted UE, will be pre-empted. If pre-emption UE determines to pre-empt all reserved resource(s) indicated by the SCI, the pre-emption UE will transmit a PI including this state. Alternatively, if the pre-emption UE determines not to pre-empt any reserved resource indicated by the SCI, the pre-emption UE will not transmit such PI including this state. Details please refer to the above paragraphs.

For instance, if one or more sub-channels are pre-empted by pre-emption UE, the pre-emption UE may transmit a PI with one bit to the pre-empted UE, to indicate that all the reserved resources indicated by the SCI will be pre-empted.

In some embodiments of the present application, a PI includes two states. One state of the two states may indicate that only a first resource of all reserved resources indicated by the SCI will be pre-empted. The other state of the two states may indicate that all the reserved resources indicated by the SCI will be pre-empted.

For example, these two states of the PI may be represented by one bit. Value 0 of the bit represents that only a first resource of all reserved resources indicated by the SCI will be pre-empted, while value 1 of the bit represents that all the reserved resources indicated by the SCI will be pre-empted, and vice versa.

For instance, if one or more sub-channels are pre-empted by pre-emption UE, the pre-emption UE may transmit one bit with value 1 to the pre-empted UE, to indicate that the pre-empted reserved resource is the first resource of all the reserved resources indicated by the SCI or a transmission resource of the current TB. Alternatively, the pre-emption UE may transmit one bit with value 0 to the pre-empted UE, to indicate the pre-empted reserved resources are all the reserved resources indicated by the SCI or reserved resources of a next TB.

In some embodiments of the present application, the PI includes one or more states to indicate that a subset within all reserved resources indicated by the SCI will be pre-empted. The one or more states may be represented as a bitmap corresponding to the subset within the reserved resources to be pre-empted. For instance, if one or more sub-channels are pre-empted by pre-emption UE, the pre-emption UE will transmit two or more bits to the pre-empted UE, to indicate the pre-empted reserved resources, i.e., the subset within the reserved resources indicated by the SCI.

In some embodiments of the present application of the CDM manner, following tables shows mapping between HARQ-ACK feedback and pre-emption indication (PI) states and PSFCH resource/cyclic shift for an actual PSFCH transmission.

TABLE 1

Transmission of HARQ-ACK multiplexed with a PI from different UEs (pre-emption UE does not functions as a Rx UE of pre-empted UE)

| HARQ-ACK, Pre-emption | b(0), b(1) |
|---|---|
| ACK | 1, 1 |
| Pre-emption | 0, 1 |
| NACK/DTX (discontinuous transmission) | 0, 0 |
| non-pre-emption | 1, 0 |

TABLE 2

Transmission of HARQ-ACK multiplexed with a PI from the same UE (pre-emption UE also functions as a Rx UE of pre-empted UE)

| HARQ-ACK, Pre-emption | b(0), b(1) |
|---|---|
| ACK, pre-emption | 1, 1 |
| ACK, non-pre-emption | 0, 1 |
| NACK/DTX, pre-emption | 0, 0 |
| NACK/DTX, non-pre-emption | 1, 0 |

In some embodiments of the present application, if reserved resource(s) by pre-empted UE is partial overlapped with selected resource(s) by pre-emption UE, the pre-emption UE may transmit a PI to preempt all of the reserved resource(s). Then, pre-empted UE will stop using all the reserved resource(s) for transmitting an initial transmission of a transport block (TB) or a retransmission of a TB. In some embodiments of the present application, when reserved resource(s) having partial overlapping and full overlapping in the same scenario, the pre-emption UE may preferentially select full overlapping resource, considering resource pool efficiency.

Figure 10:
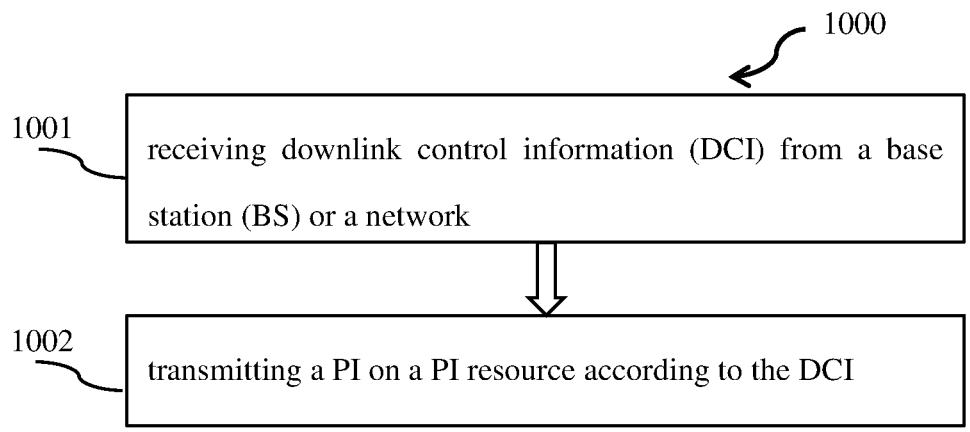
FIG. 10 illustrates a further exemplary flow chart of a method for wireless communication in accordance with some embodiments of the present application.

FIG. 10 illustrates a further exemplary flow chart of a method for wireless communication in accordance with some embodiments of the present application. The embodiments of FIG. 10 may be performed by pre-emption UE (e.g., UE 101a or UE 101b illustrated and shown in FIG. 1).

In the exemplary method 1000 as illustrated and shown in FIG. 10, in step 1001, a UE (e.g., UE 101a illustrated and shown in FIG. 1) receives downlink control information (DCI) from a base station (BS) (e.g., BS 102 as illustrated and shown in FIG. 1) or a network. The DCI indicates the UE to transmit a PI on a sidelink and further indicates a PI resource on the sidelink. In step 1002, the UE transmits the PI on the PI resource according to the DCI. The PI resource may be a time and frequency resource configured or pre-configured in a resource pool. A resource pool may be named as a sidelink resource pool. For example, the PI resource represents some sub-channel within some time slot.

Details described in all other embodiments of the present application (for example, details of how to transmit a PI and contents related to a PI) are applicable for the embodiments of FIG. 10. Moreover, details described in the embodiments of FIG. 10 are applicable for all the embodiments of FIGS. 1-9 and 11-13.

Some embodiments of the present application provide behaviours of a Tx UE (i.e., pre-empted UE) upon detection of a PI from another UE, e.g., how to trigger retransmission if NACK is received in PSFCH and pre-emption indication is received.

Figure 11:
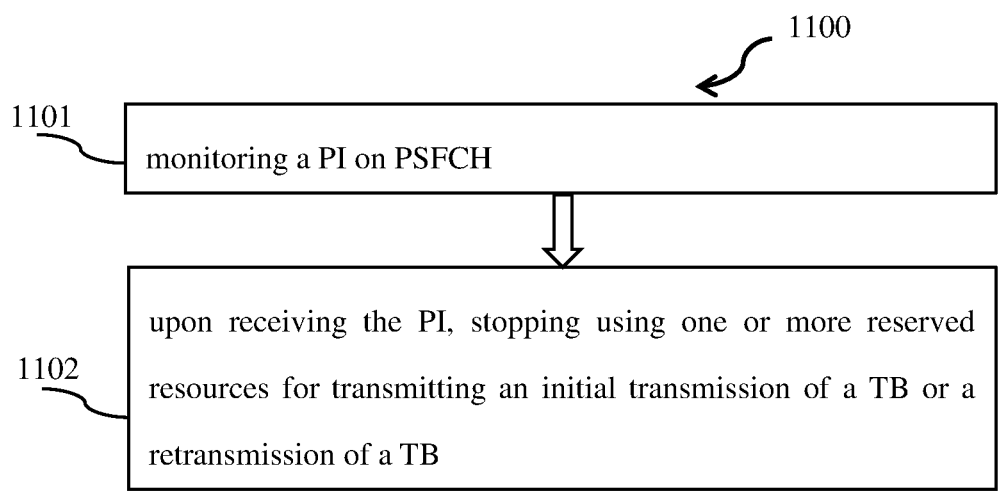
FIG. 11 illustrates another exemplary flow chart of a method for wireless communication in accordance with some embodiments of the present application.

FIG. 11 illustrates another exemplary flow chart of a method for wireless communication in accordance with some embodiments of the present application. The embodiments of FIG. 11 may be performed by pre-empted UE (e.g., UE 101a or UE 101b illustrated and shown in FIG. 1).

In the exemplary method 1100 as illustrated and shown in FIG. 11, in step 1101, a UE (e.g., UE 101a illustrated and shown in FIG. 1) monitors a PI on PSFCH. In step 1102, upon receiving the PI, the UE stops using one or more reserved resources for transmitting a transmission or retransmission of a sidelink transmission.

In some embodiments of the present application, if pre-empted UE has reserved multiple resources in time domain, the first reserved resource after a PI resource will be pre-empted. For example, if pre-empted UE receives a NACK and a PI simultaneously, the pre-empted UE will not perform a retransmission in response to the NACK on the first reserved resource. Moreover, the UE does not expect to receive HARQ feedback. For instance, the UE may report a NACK feedback or a pre-emption indicator to an upper layer in response to the PSFCH associated with the first reserve resource (i.e., pre-empted resource). The pre-emption indicator represents that first reserved resource of the UE has been pre-empted. Then, the UE may perform the retransmission on the second reserved resource, if any.

In some embodiments of the present application, pre-empted UE receives DCI from a BS or a network. The DCI indicates the UE to stop using one or more reserved resources, which will be pre-empted and used by pre-emption UE. Upon receiving the DCI, the pre-empted UE will stop using the pre-empted one or more reserved resources.

In some embodiments of the present application, pre-empted UE transmits SCI indicating one or more reserved resources. The SCI explicitly or implicitly indicates a PI resource on the PSFCH.

Details described in the embodiments as illustrated and shown in FIGS. 2-10, especially, contents related to a PI, a PI resource, and the SCI, are applicable for the embodiments as illustrated and shown in FIG. 11. Moreover, details described in the embodiments of FIG. 11 are applicable for all the embodiments of FIGS. 1-10, 12, and 13.

Figure 12:
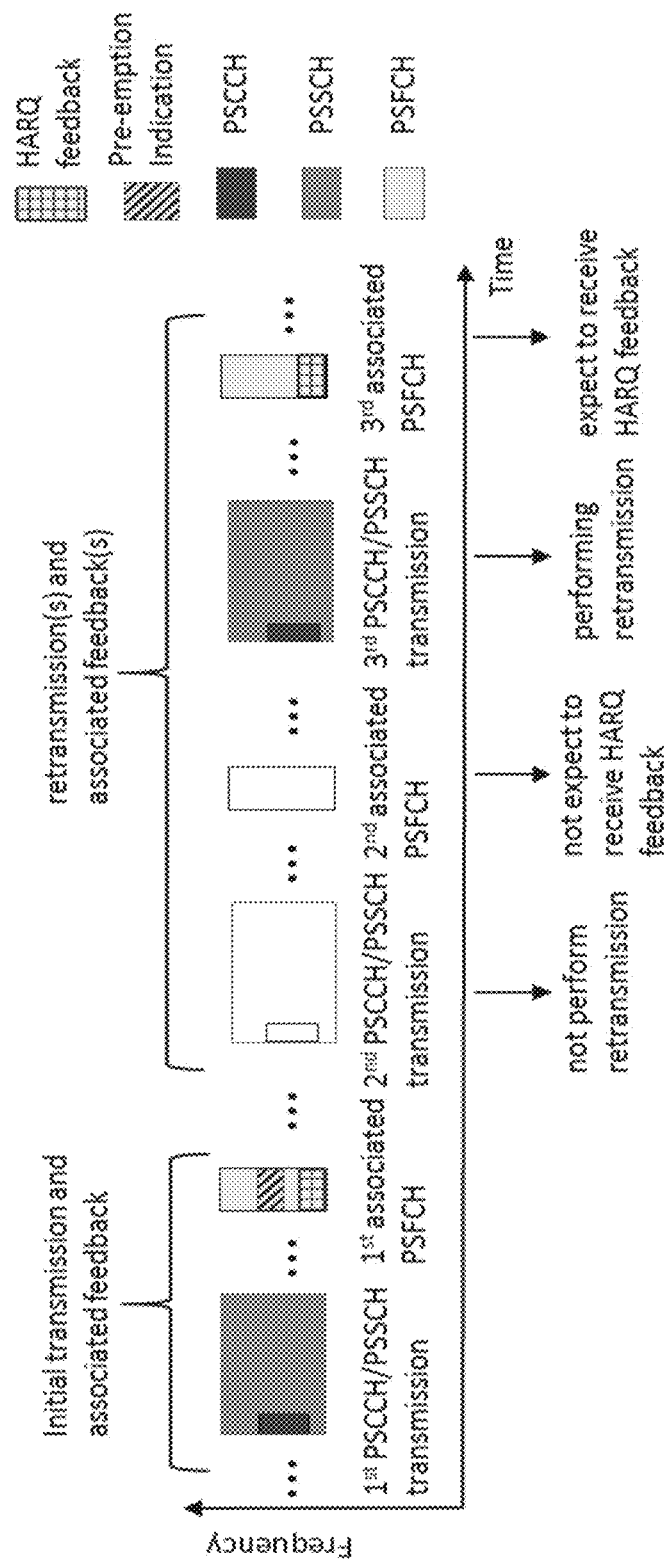
FIG. 12 illustrates yet another exemplary V2X communication data format in accordance with some embodiments of the present application.

FIG. 12 illustrates yet another exemplary V2X communication data format in accordance with some embodiments of the present application. The V2X communication data format as illustrated and shown in FIG. 12 corresponds to the embodiments of FIG. 11.

Similar to FIGS. 2-4 and 6-9, the V2X communication data as illustrated and shown in FIG. 12 may be transmitted in the V2X communication system as illustrated and shown in FIG. 1, and the V2X communication data may include more or fewer symbols in more or fewer time slots in time domain. Details described in the embodiments as illustrated and shown in FIGS. 2-11, especially, contents related to a PI, a PI resource, and the SCI, are applicable for the embodiments as illustrated and shown in FIG. 12.

More specifically, in the embodiments of FIG. 12, the initial transmission and associated feedback of a Tx UE (e.g., UE 101a illustrated and shown in FIG. 1) include $1^{st}$ PSCCH/PSSCH transmission and $1^{st}$ associated PSFCH, retransmission(s) and associated feedback(s) are reserved resources of the Tx UE and include $2^{nd}$ PSCCH/PSSCH transmission, $2^{nd}$ associated PSFCH, $3^{rd}$ PSCCH/PSSCH transmission, and $3^{rd}$ associated PSFCH. Without a preemption operation, the Tx UE may perform retransmission(s) on any of $2^{nd}$ PSCCH/PSSCH transmission and $3^{rd}$ PSCCH/PSSCH transmission, and may transmit associated HARQ feedback for the retransmission(s) on any of $2^{nd}$ associated PSFCH and $3^{rd}$ associated PSFCH.

However, when the Tx UE functions as pre-empted UE and some reserved resources of the Tx UE (e.g., $2^{nd}$ PSCCH/PSSCH transmission and $2^{nd}$ associated PSFCH) are pre-empted by pre-emption UE (e.g., UE 101b illustrated and shown in FIG. 1), the Tx UE will not perform retransmission on $2^{nd}$ PSCCH/PSSCH transmission, and will not expect to receive HARQ feedback on $2^{nd}$ associated PSFCH, as shown in FIG. 12. Then, the Tx UE may perform retransmission on $3^{rd}$ PSCCH/PSSCH transmission, and expect to receive HARQ feedback on $3^{rd}$ associated PSFCH, as shown in FIG. 12, due to the pre-emption UE not pre-empting these two reserved resources.

In the embodiments of FIG. 12, when a reservation of resource is disabled, the Tx UE (i.e., pre-empted UE) may select two or more resources during candidate resource selection process and transmit SCI without indicating the reservation of another resource. When the Tx UE receives a PI in the PSFCH, it can use the already selected resource for (re)-transmission. The embodiments of FIG. 12 do not require pre-empted UE to perform candidate resource selection for the pre-empted resource again, but could transmit data successfully within a packet delay budget (PDB).

The embodiments of FIG. 12 mean that pre-emption UE determines whether a resource can be used for a sidelink transmission based on a detection result or a sensing result of its associated PI transmission resource.

Embodiments of the present application are not limited to the foregoing PI transmitting method, according to other PI transmission method(s), and for example, a PI may be transmitted in PSCCH or PSSCH.

Figure 13:
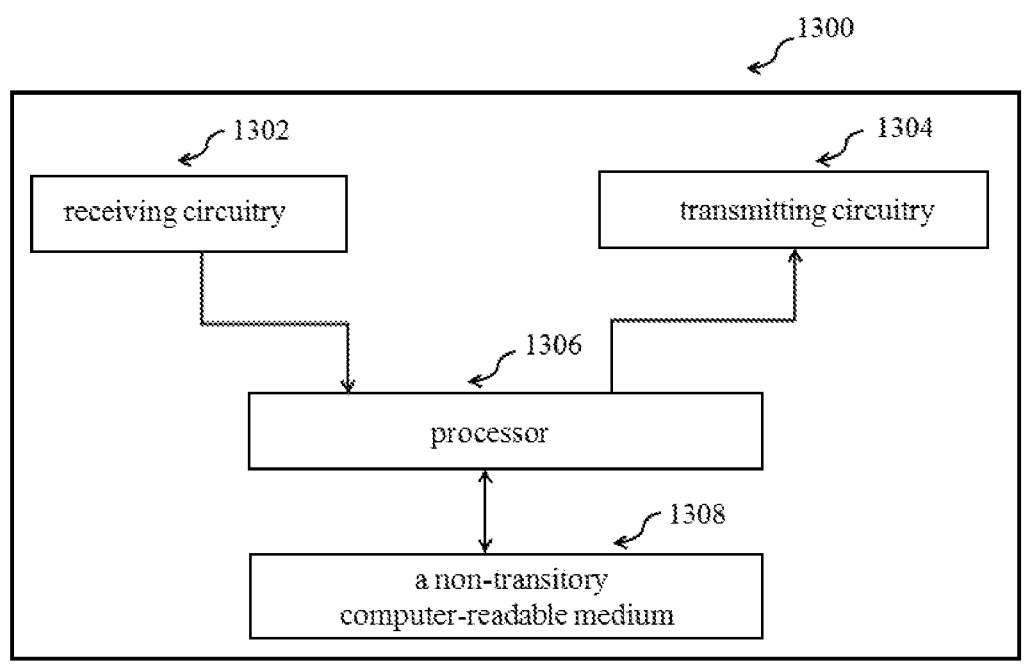
FIG. 13 illustrates a block diagram of an exemplary apparatus in accordance with some embodiments of the present application.

FIG. 13 illustrates a block diagram of an exemplary apparatus in accordance with some embodiments of the present application. Referring to FIG. 13, the apparatus 1300 includes a receiving circuitry 1302, a transmitting circuitry 1304, a processor 1306, and a non-transitory computer-readable medium 1308. The processor 1306 is coupled to the non-transitory computer-readable medium 1308, the receiving circuitry 1302, and the transmitting circuitry 1304.

It is contemplated that some components are omitted in FIG. 13 for simplicity. In some embodiments, the receiving circuitry 1302 and the transmitting circuitry 1304 may be integrated into a single component (e.g., a transceiver).

In some embodiments, the non-transitory computer-readable medium 1308 may have stored thereon computer-executable instructions to cause a processor to implement the operations with respect to BS(s) as described above. For example, upon execution of the computer-executable instructions stored in the non-transitory computer-readable medium 1308, the processor 1306 and the transmitting circuitry 1304 perform the method of FIG. 5, including: receiving a SCI indicating one or more reserved resources, wherein the SCI explicitly or implicitly indicates a PI resource on PSFCH; determining whether the one or more reserved resources can be pre-empted; upon determining that the one or more reserved resources can be pre-empted, transmitting a PI on the PI resource on the PSFCH to pre-empt the one or more reserved resources; and performing a sidelink transmission on the pre-empted one or more reserved resources.

In some embodiments, the non-transitory computer-readable medium 1308 may have stored thereon computer-executable instructions to cause a processor to implement the operations with respect to Tx UE(s) as described above. For example, upon execution of the computer-executable instructions stored in the non-transitory computer-readable medium 1308, the processor 1306 and the transmitting circuitry 1304 perform the method of FIG. 11, including: receiving DCI from a BS or a network, wherein the DCI indicates the UE to transmit a PI on a sidelink, and the DCI further indicates a PI resource on the sidelink; and transmitting the PI on the PI resource according to the DCI.

In some embodiments, the non-transitory computer-readable medium 1308 may have stored thereon computer-executable instructions to cause a processor to implement the operations with respect to Rx UE(s) as described above. For example, upon execution of the computer-executable instructions stored in the non-transitory computer-readable medium 1308, the processor 1306 and the receiving circuitry 1302 perform the method of FIG. 12, including: monitoring a PI on PSFCH; and upon receiving the PI, stopping using one or more reserved resources for transmitting an initial transmission of a transport block (TB) or a retransmission of a TB.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method for sidelink communications performed by a user equipment (UE), the method comprising:
    receiving sidelink control information (SCI) indicating one or more reserved resources, wherein the SCI explicitly or implicitly indicates a pre-emption indication (PI) resource on physical sidelink feedback channel (PSFCH);
    determining whether the one or more reserved resources can be pre-empted;
    upon determining that the one or more reserved resources can be pre-empted, transmitting a PI on the PI resource on the PSFCH to pre-empt the one or more reserved resources; and
    performing a sidelink transmission on the pre-empted one or more reserved resources.

2. The method of claim 1, comprising: determining to perform a pre-emption operation based on at least one of:
    compared with a resource ratio threshold value of a total number of candidate resources, there is no enough candidate resource in a resource selection window;
    compared with a power threshold value, there is no suitable candidate resource in the resource selection window;
    after a power is increased in times greater than a maximum increasing threshold number, there is no suitable candidate resource in the resource selection window;
    a measured channel busy ratio (CBR) is greater than a CBR threshold value; and
    a packet delay budget of the sidelink transmission is less than a delay budget threshold value.

3. The method of claim 2, comprising:
    selecting a pre-emption reserved resource set, wherein the pre-emption reserved resource set includes the one or more reserved resources; and
    reporting the pre-emption reserved resource set to an upper layer.

4. The method of claim 1, wherein the one or more reserved resources can be pre-empted when satisfying at least one condition of:
    a priority level indicated in the SCI is lower than a priority level of the UE; and
    transmission times of a sidelink transmission indicated in the SCI is equal to or greater than threshold transmission times.

5. The method of claim 1, wherein the PI resource is configured on the same time resource as but a different frequency resource from a Hybrid Automatic Repeat Request (HARQ) feedback resource on the PSFCH.

6. The method of claim 1, wherein the PI resource is configured on the same time and frequency resource as a HARQ feedback transmission resource on the PSFCH, but uses a different cyclic shift from the HARQ feedback transmission resource.

7. The method of claim 1, wherein the PI resource is configured on a different time resource from a HARQ feedback transmission resource on the PSFCH.

8. The method of claim 1, wherein the SCI implicitly indicating the PI resource comprises that the SCI includes at least one of: a first indicator for indicating HARQ enabled or disabled, and a second indicator for indicating single sub-channel or a non-single sub-channel; and based on the first indicator indicating the HARQ disabled, the second indicator indicating single sub-channel, or a combination thereof, a HARQ feedback transmission resource on the PSFCH is used as the PI resource and the PI is transmitted on the HARQ feedback transmission resource.

9. The method of claim 1, wherein a resource pool is divided into a plurality of sub-channels, and each of the plurality of sub-channels is configured to include the PI resource or not.

10. The method of claim 1, wherein the PI includes one state to indicate that all of the one or more reserved resources will be pre-empted.

11. A user equipment (UE), comprising:
    at least one memory; and
    at least one processor coupled with the at least one memory and configured to cause the UE to:
        receive sidelink control information (SCI) indicating one or more reserved resources, wherein the SCI explicitly or implicitly indicates a pre-emption indication (PI) resource on physical sidelink feedback channel (PSFCH);
        determine whether the one or more reserved resources can be pre-empted;
        upon determining that the one or more reserved resources can be pre-empted, transmit a PI on the PI resource on the PSFCH to pre-empt the one or more reserved resources; and
        perform a sidelink transmission on the pre-empted one or more reserved resources.

12. The UE of claim 11, wherein the at least one processor is further configured to cause the UE to perform a pre-emption operation based on at least one of:
    compared with a resource ratio threshold value of a total number of candidate resources, there is no enough candidate resource in a resource selection window;
    compared with a power threshold value, there is no suitable candidate resource in the resource selection window;
    after a power is increased in times greater than a maximum increasing threshold number, there is no suitable candidate resource in the resource selection window;
    a measured channel busy ratio (CBR) is greater than a CBR threshold value; and
    a packet delay budget of the sidelink transmission is less than a delay budget threshold value.

13. The UE of claim 12, wherein the at least one processor is further configured to cause the UE to:
    select a pre-emption reserved resource set, wherein the pre-emption reserved resource set includes the one or more reserved resources; and
    report the pre-emption reserved resource set to an upper layer.

14. The UE of claim 11, wherein the one or more reserved resources can be pre-empted when satisfying at least one condition of:
    a priority level indicated in the SCI is lower than a priority level of the UE; and
    transmission times of a sidelink transmission indicated in the SCI is equal to or greater than threshold transmission times.

15. The UE of claim 11, wherein the PI resource is configured on the same time resource as but a different frequency resource from a Hybrid Automatic Repeat Request (HARQ) feedback resource on the PSFCH.

16. The UE of claim 11, wherein the PI resource is configured on the same time and frequency resource as a HARQ feedback transmission resource on the PSFCH, but uses a different cyclic shift from the HARQ feedback transmission resource.

17. The UE of claim 11, wherein the PI resource is configured on a different time resource from a HARQ feedback transmission resource on the PSFCH.

18. The UE of claim 11, wherein the SCI implicitly indicating the PI resource comprises that the SCI includes at least one of: a first indicator for indicating HARQ enabled or disabled, and a second indicator for indicating single sub-channel or a non-single sub-channel; and based on the first indicator indicating the HARQ disabled, the second indicator indicating single sub-channel, or a combination thereof, a HARQ feedback transmission resource on the PSFCH is used as the PI resource and the PI is transmitted on the HARQ feedback transmission resource.

19. The UE of claim 11, wherein a resource pool is divided into a plurality of sub-channels, and each of the plurality of sub-channels is configured to include the PI resource or not.

20. A processor for wireless communication, comprising:
at least one controller coupled with at least one memory and configured to cause the processor to:
receive sidelink control information (SCI) indicating one or more reserved resources, wherein the SCI explicitly or implicitly indicates a pre-emption indication (PI) resource on physical sidelink feedback channel (PSFCH);
determine whether the one or more reserved resources can be pre-empted;
upon determining that the one or more reserved resources can be pre-empted, transmit a PI on the PI resource on the PSFCH to pre-empt the one or more reserved resources; and
perform a sidelink transmission on the pre-empted one or more reserved resources.

* * * * *